United States Patent [19]

Eckberg

[11] Patent Number: 4,670,531

[45] Date of Patent: Jun. 2, 1987

[54] INHIBITED PRECIOUS METAL CATALYZED ORGANOPOLYSILOXANE COMPOSITIONS

[75] Inventor: Richard P. Eckberg, Saratoga Springs, N.Y.

[73] Assignee: General Electric Company, Waterford, N.Y.

[21] Appl. No.: 820,844

[22] Filed: Jan. 21, 1986

[51] Int. Cl.$^4$ ............................................. C08G 77/06
[52] U.S. Cl. ...................................... 528/15; 528/21; 528/31; 528/32; 525/478
[58] Field of Search ................... 528/15, 31, 32, 21; 525/478

[56] References Cited

U.S. PATENT DOCUMENTS

| | | | |
|---|---|---|---|
| 3,188,299 | 6/1965 | Chalk | 260/46.5 |
| 3,188,300 | 6/1965 | Chalk | 260/46.5 |
| 3,192,181 | 6/1965 | Moore | 260/46.5 |
| 3,344,111 | 9/1967 | Chalk | 260/46.5 |
| 3,445,420 | 5/1969 | Kookootsedes et al. | 260/37 |
| 3,453,233 | 7/1969 | Flatt | 260/46.5 |
| 3,461,185 | 8/1969 | Brown | 260/825 |
| 3,723,567 | 3/1973 | Mink et al. | 260/825 |
| 3,882,083 | 5/1975 | Berger et al. | 260/46.5 |
| 4,043,977 | 8/1977 | de Montigny et al. | 260/46.5 |
| 4,239,867 | 12/1980 | Legrow et al. | 525/478 |
| 4,256,870 | 3/1981 | Eckberg | 528/15 |
| 4,347,346 | 8/1982 | Eckberg | 528/15 |
| 4,584,361 | 4/1986 | Janik et al. | 528/15 |
| 4,585,669 | 4/1966 | Eckberg | 528/32 |
| 4,587,137 | 5/1986 | Eckberg | 528/32 |

*Primary Examiner*—Melvyn I. Marquis
*Attorney, Agent, or Firm*—G. L. Loser

[57] ABSTRACT

There are provided curable compositions, comprising (a) an organopolysiloxane base polymer, (b) an organohydrogenpolysiloxane crosslinking agent, (c) an effective amount of precious metal containing catalyst, and (d) and azo compound wherein at least one —N=N— moiety is not part of a cyclic structure, and preferably is alpha to an electron withdrawing group such as carbonyl, in an amount effective to inhibit reaction of said organopolysiloxane base polymer and said organohydrogenpolysiloxane crosslinking agent. Articles of manufacture as well as methods for preparation of such compositions and articles are also provided.

20 Claims, No Drawings

INHIBITED PRECIOUS METAL CATALYZED ORGANOPOLYSILOXANE COMPOSITIONS

BACKGROUND OF THE INVENTION

The present invention relates to organopolysiloxane compositions which are curable in the presence of a precious metal containing catalyst by reaction of ≡SiH groups with silicon-bonded olefinically unsaturated groups. More particularly, the present invention relates to novel inhibitors for such addition curable organopolysiloxane compositions which permit the ingredients to be combined for considerable lengths of time without curing.

Silicone compositions which are curable by reaction of ≡SiH groups with silicon-bonded olefinic groups in the presence of a hydrosilation catalyst are well known in the art, for example, as described in U.S. Pat. Nos. 2,823,218; 3,249,581 and 3,436,366, all of which are incorporated by reference into the present disclosure. Because curing begins upon mixing of the aforesaid ingredients, it is the usual practice to provide addition curable compositions in two packages, one of which contains the olefinically unsaturated polysiloxane and the hydrosilation catalyst, and the other the organohydrogenpolysiloxane crosslinking agent.

When it is necessary to extend the the pot life of addition curable organopolysiloxane compositions or provide one-component addition curable organopolysiloxane composition, a cure inhibitor can be included therein. Generally, cure inhibitors are compounds which slow curing at ambient temperatures but do not retard curing at elevated temperatures. Examples of inhibited, precious metal catalyzed organopolysiloxane compositions can be found in U.S. Pat. Nos. 3,188,299 (dialkyl formamides, thioamides, alkyl thioureas); 3,188,300 (organophosphorous); 3,192,181 (benzotriazoles); 3,344,111 (nitriles); 3,445,420 (acetylenic alcohols); 3,453,233 (tris-triorganosilyl amines); 3,461,185 (tetramethylguanidine carboxylates); 3,723,567 (aminoalkylalkoxysilanes); 3,882,083 (isocyanurates); 4,043,977 (diaziridines); 4,239,867 (higher alkyl amines); 4,256,870 (dialkyl maleic esters); and 4,347,346 (dialkylacetylene dicarboxylates).

SUMMARY OF THE INVENTION

It is an object of the present invention to provide inhibited, precious metal catalyzed organopolysiloxane compositions wherein the inhibitor can be deactivated by exposing the composition to ultraviolet radiation or to elevated temperatures.

It is another object of the present invention to provide a method for curing precious metal catalyzed organopolysiloxane compositions which includes the step of exposing the composition to ultraviolet radiation so as to deactivate a cure inhibitor.

Still another object of the present invention is to provide an article of manufacture which comprises a substrate sensitive to exposure to heat which has a precious metal catalyzed organopolysiloxane composition cured thereon.

In accordance with these and other objects which will become apparent from the following description, there are provided curable compositions, comprising:
(a) an organopolysiloxane base polymer;
(b) an organohydrogenpolysiloxane crosslinking agent;
(c) an effective amount of precious metal containing catalyst; and
(d) an azo compound wherein at least one —N=N— moiety is not part of a cyclic structure, and preferably is alpha to an electron withdrawing group such as carbonyl, in an amount effective to inhibit reaction of said organopolysiloxane base polymer and said organohydrogenpolysiloxane crosslinking agent.

DESCRIPTION OF THE INVENTION

Broadly stated, the present invention provides curable compositions comprising:
(a) an organopolysiloxane base polymer;
(b) an organohydrogenpolysiloxane crosslinking agent;
(c) an effective amount of precious metal containing catalyst; and
(d) an azo compound wherein at least one —N=N— moiety is not part of a cyclic structure, in an amount effective to inhibit reaction of said organopolysiloxane base polymer and said organohydrogenpolysiloxane crosslinking agent.

Organopolysiloxane (a) can be any silicone polymer which will react with an organohydrogenpolysiloxane in the presence of a precious metal containing catalyst. Preferably, the organopolysiloxane base polymer is an olefinorganopolysiloxane having structural units of the formula

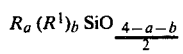  (I)

where R is an organic radical, preferably selected from the group consisting of monovalent hydrocarbon radicals, halogenated monovalent hydrocarbon radicals and cyanoalkyl radicals, or a mixture thereof; $R^1$ is an olefinic organic radical, preferably selected from the group consisting of vinyl allyl, cyclohexenyl, acrylate and methacrylate, or a mixture thereof; a has a value ranging from 0 to 3, inclusive; b has a value ranging from about 0.005 to about 2.0, inclusive; the sum of a +b ranges from about 0.8 to 3, inclusive; and the viscosity of said olefinorganopolysiloxane ranges from about 10 centipoise to about 250,000,000 centipoise or more, preferably from 50 centipoise to 1,000,000 centipoise, and most preferably from 100 centipoise to 100,000 centipoise at 25° C. Olefinorganopolysiloxanes within the scope of Formula I as well as methods for their preparation are well known in the art.

It is also contemplated that silanol-terminated organopolysiloxanes having the general formula

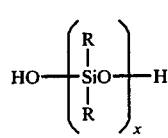  (IA)

where R is as previously defined and x is sufficient to provide a viscosity as previously described, can be utilized as the base polymer (a). Silanol-terminated organopolysiloxanes within the scope of Formula IA are well known in the art and can be prepared for example, by equilibrating cyclic polysiloxanes with an alkali metal hydroxide catalyst. The desired viscosity can be obtained by controlling the amount of water added to the equilibrium reaction.

Other suitable base polymers will be obvious to those skilled in the art or their acceptability can be ascertained without undue experimentation.

Organohydrogenpolysiloxane (b) can be any Si-H containing polymer utilized by those skilled in the art as a crosslinking agent. Preferably, the organohydrogenpolysiloxane crosslinking agent has structural units of the formula

where R is an organic radical, preferably selected from the group consisting of monovalent hydrocarbon radicals, halogenated monovalent hydrocarbon radicals and cyanoalkyl radicals, or a mixture thereof; a has a value ranging from 0 to 3, inclusive; b has a value ranging from about 0.005 to about 2.0, inclusive; the sum of a+b ranges from about 0.8 to about 3, inclusive; and the viscosity ranges from about 10 centipoise to about 10,000 centipoise, and preferably from 50 centipoise to 1000 centipoise at 25° C.

The organohydrogenpolysiloxanes represented by Formula II are also well known in the art and can be prepared by methods known to those skilled in the art. Such organohydrogenpolysiloxanes can possess a linear or a resinous structure or consist of a mixture thereof.

Precious metal containing catalyst (c) can be any catalyst known in the art to promote reaction of base polymer (a) and organohydrogenpolysiloxane crosslinking agent (b). The precious metal catalysts employed in compositions of the present invention include those based on the metals rhodium, ruthenium, palladium, osmium, irridium and platinum. Especially preferred are the well known platinum and rhodium catalysts such as the platinum hydrocarbon complexes described in U.S. Pat. Nos. 3,159,601 and 3,159,662 to Ashby, the platinum alcoholate catalysts described in U.S. Pat. No. 3,220,970 to Lamoreaux, the platinum complexes of U.S. Pat. No. 3,814,730 to Karstedt, the platinum chloride-olefin complexes described in U.S. Pat. No. 3,516,946 to Modic, and the rhodium complexes described in U.S. Pat. No. 4,262,107 to Eckberg, all of which are incorporated herein by reference. Generally, the precious metal containing catalyst is used in an amount of from about 5 ppm to about 500 ppm (as weight of metal atoms) based on the weight of components (a) and (b). Other catalysts will be apparent to the artisan or their suitability can be ascertained without undue experimentation.

The key component of the instant invention resides in the use of an azo compound having at least one azo moiety (e.g. —N=N—) which is not part of a cyclic structure, in an amount effective to inhibit reaction of said organopolysiloxane base polymer (a) and said organohydrogenpolysiloxane crosslinking agent (b) at ambient temmperatures. The inhibiting effect of the azo compounds employed in the present invention can be negated by exposing the curable compositions to elevated temperatures or a source of ultraviolet radiation.

Preferably, the azo compounds have the general formula $$R-N=N-R \qquad (III)$$

where each R is an independently selected organic radical which may contain hetero atoms such as oxygen, sulfur, and nitrogen, and which hetero atoms may be bonded to a nitrogen atom of the azo moiety. Especially preferred azo compounds contain an electron withdrawing group in close proximity to the azo moiety and thus have the general formula $$R-X-N=N-X-R \qquad (IV)$$

where each R is as defined for Formula III and X is an electron withdrawing moiety such as carbonyl. Because of their commercial availability and excellent results of dialkylazodicarboxylates of the formula

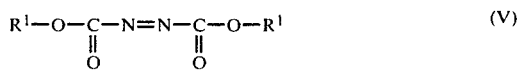

where each $R^1$ is an independently selected $C_{1-6}$ hydrocarbon radical, are most preferred. Diethylazodicarboxylate and diisopropylazodicarboxylate have been found to be particularly effective.

For reasons which are not completely understood, azobenzene is ineffective as an inhibitor for compositions within the scope of the present invention. It is believed that its inability to function as an inhibitor is due to the unusual stability generally associated with compounds having a double bond conjugated with an aromatic ring. In any event, those of ordinary skill in the art will be able to select suitable azo inhibitors without undue experimentation in view of the foregoing teachings and the examples provided hereinbelow.

In a particularly preferred embodiment of the present invention, ingredients (a) and (b) are replaced with a polysiloxane which contains both silicon-bonded olefinic radicals and silicon-bonded hydrogen atoms, for example, as taught by Eckberg in U.S. Pat. Nos. 4,585,669 and 4,587,137, and assigned to the same assignee as the present invention. The disclosures of these patent applications are incorporated herein by reference.

Briefly, the Eckberg patent applications disclose curable compositions comprising (i) a polysiloxane having the general formula

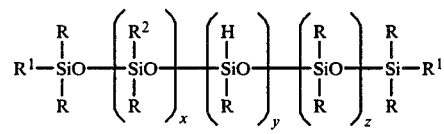

where each R is independently selected from substituted or unsubstituted monovalent hydrocarbon radical having from 1 to 20 carbon atoms; $R^1$ is hydrogen, hydroxyl, or a substituted or unsubstituted hydrocarbon or hydrocarbonoxy radical having from 1 to 20 carbon atoms; $R^2$ is an olefinic radical; x is a number such that there is present from about 0.1 to about 20 mole percent olefin-containing siloxy units; y is a number such that there is present from about 0.5 to about 50 mole percent hydrogen-containing siloxy units; and x+y+z is a number such that the viscosity of said polysiloxane is from about 25 centipoise to about 2,500,000 centipoise at 25° C.; (ii) a precious metal containing catalyst; and (iii) a free radical catalyst.

The use of such compositions in combination with the inhibitors of the present invention provides the advantage that exposure to ultraviolet radiation not only inactivates the inhibitor but can also initiate free radical curing in the presence of such photosensitizers as benzophenone and t-butylanthraquinone.

Compositions of the present invention can be prepared by mixing the ingredients in any order. While the addition of precious metal catalyst without the azo inhibitor will cause the beginning of interaction with ingredients (a) and (b), the extent of reaction in only a few minutes time at ambient temperature will ordinarily be negligible, within which time the azo inhibitor will normally have been added. Preferably, the inhibitor is admixed with the base polymer and organohydrogenpolysiloxane prior to addition of the precious metal catalyst. Of course, conventional additives for various applications (e.g. release coating, conformal coating) can also be included in the composition. Such additives include, for example, fillers such as fumed silica and ground quartz, pigments, dyes flow agents, and the like.

The amount of inhibitor which is admixed will vary depending upon the particular azo compound employed, the degree of inhibition required, the form of the precious metal catalyst, and the nature and amounts of the other ingredients. Generally, the amount of azo inhibitor utilized will range from as little as 0.005 weight percent to 2 weight percent or more, with from 0.01 weight percent to 0.5 weight percent based on the weight of components (a) and (b) being particularly preferred.

It is contemplated that the compositions of the present invention can be provided in one-package or as a multi-package system, for example, as taught by Grenoble and Eckberg in U.S. Pat. No. 4,448,815.

Curing of the composition, whether utilized as a coating for a substrate or as a rubber (e.g. thick section), is initiated either by the application of heat, for example, above about 70° C., or by exposing the composition to a source of ultraviolet radiation. It is particularly desirable to initiate curing by exposing the curable composition to ultraviolet radiation when a heat sensitive substrate, such as an electronic component or low melting plastic, is to be coated with the composition of the present invention. Of course, curing can be accelerated by exposing the coated substrate to elevated temperatures when doing to does not present a problem.

In order to better enable those skilled in the art to practice the present invention, the following examples are provided by way of illustration and not by way of limitation. All parts and percentages are by weight unless otherwise noted.

EXAMPLES

EXAMPLE 1

A mixture of polysiloxane polymers identified as "Silicone A" was prepared by blending 7 parts of a 200 centipoise dimethylvinyl terminated polydimethylsiloxane and 3 parts of a 3000 centipoise dimethylvinyl terminated polydimethylsiloxane. The resultant Silicone A had a viscosity of 600 centipoise at 25° C. An organohydrogenpolysiloxane identified as "Silicone B" was prepared by acid equilibration of $M(D^H)_{20}M$, octamethylcyclotetrasiloxane and tetramethyltetravinylcyclotetrasiloxane. Silicone B had a viscosity of 700 centipoise at 25° C., 55 mole percent $D^H$ units, 43 mole percent D units and 2 mole percent $D^{Vinyl}$ units.

Using Silicone A and Silicone B as base materials, the following blends were prepared:

Blend A: Silicone A+100 ppm platinum catalyst as Pt (prepared according to U.S. Pat. No. 3,814,730 to Karstedt)+0.2 weight percent DEAZD (diethylazodicarboxylate);

Blend B: Silicone A+100 ppm platinum catalyst as Pt+0.1 weight percent DEAZD;

Blend C: Silicone A+100 ppm platinum catalyst as Pt+0.1 weight percent DEAZD+2 weight percent benzophenone;

Blend D: Silicone B+2 weight percent benzophenone;

Blend E: Silicone A+150 ppm platinum catalyst as Pt+0.1 weight percent DEAZD;

Blend F: Silicone A+100 ppm platinum catalyst as Pt+0.1 weight percent pyrazole (azo moiety within cyclic structure);

Blend G: Silicone B with no additives.

Coating baths were prepared by mixing 9 parts by weight of the platinum/azo containing blends with 1 part by weight of Blend D or Blend G. Ultraviolet or thermal curing was assessed by coating paper and aluminum Q panel substrates, then exposing the coated substrate to one 300 watt/inch Hanovia medium pressure UV lamp or by hanging the coated substrates in a forced air oven maintained at 75° C. Cure was qualitatively determined by noting the presence or absence of smear, migration and rub-off. Bath life was assessed by observing the time required for coating compositions to gel at 25° C. under normal room lighting conditions. The results are set forth in Table I.

TABLE I

| Blend | Coating Thickness | Substrate | UV Exposure, J cm$^{-2}$ | 75° C. Oven Dwell time, min. | Potlife | Results |
|---|---|---|---|---|---|---|
| A + G | 5 mil | Aluminum | — | 10 | >6 hrs | Cured to smear-free elastic film |
| " | 5 mil | Aluminum | 3.15 | — | " | Cured to smear-free film; excellent anchorage |
| " | Thin Film (<0.1 mil) | SCK paper | 0.63 | — | " | Cured; slight smear, slight migration |
| " | Thin Film (<0.1 mil) | " | 0.31 | — | " | Undercured; smears, migrates |
| B + G | 5 mil | Aluminum | — | 5 | >4 hrs. | Cured to smear-free film; excellent anchorage |
| " | " | " | 2.5 | — | " | Cured to smear and migration-free film; excellent anchorage |
| " | Thin film | SCK Paper | 0.63 | — | " | Cured; sl smear, no migration |

TABLE I-continued

| Blend | Coating Thickness | Substrate | UV Exposure, J cm$^{-2}$ | 75° C. Oven Dwell time, min. | Potlife | Results |
|---|---|---|---|---|---|---|
| " | " | " | 0.31 | — | " | undercured; smears, migrates |
| B + D | 5 mil | Aluminum | — | 5 | ~6 hrs | Cured to smear-free film |
| " | Thin film | SCK | — | 3 | " | Cured; sl smear, no migration |
| " | 5 mil | Aluminum | 5.0 | — | " | Cured - sl smear, good anchorage |
| " | Thin film | SCK | 0.63 | — | " | Poor cure; smears, migrates |
| " | " | SCK | 1.9 | — | " | Cured; sl smear, sl migration |
| E + G | 5 mil | Aluminum | — | 5 | ~2.5 hrs | Excellent cure - no smear, good anchorage |
| " | " | " | 1.3 | — | " | Partial cure - smears |
| " | " | " | 2.5 | — | " | Cured - no smear, good anchorage |
| " | Thin film | SCK | 0.63 | — | " | Cured - sl smear, no migration |
| " | 8 mil | Aluminum | 3.15 | — | " | Cured - no smear, good anchorage |
| F + G | 5 mil | " | — | 5 | >6 hrs. | Cured - smear-free coating, good anchorage |
| " | " | " | 10.0 | — | " | No Cure |

NOTE: One pass through PPG UV Processor, one lamp (300 watt in$^{-1}$) at 20 ft/min. line speed = 0.63 J cm$^{-2}$ total UV flux.
NOTE: SCK paper = 40 #/ream super calendered Kraft.

As a control, a blend of 100 ppm platinum catalyst as Pt, 0.2 weight percent butylallylmaleate and Silicone A was admixed in a 9:1 ratio with Silicone B. This composition showed no tendency to cure upon exposure to more than 8 J cm$^{-2}$ total UV power. A similar blend without the butylallylmaleate inhibitor gelled within 60 seconds at 25° C. The slow cure in the B+D Blend is apparently due to benzophenone absorbing most of the incident ultraviolet radiation. The F+G Blend illustrates that when the azo moiety is within a cyclic structure, UV curing cannot be effected.

EXAMPLE 2

The following blends were prepared in the same manner as in Example 1.

Blend H: Silicone A+100 ppm platinum catalyst as Pt+0.2 weight percent azobenzene;
Blend I: Silicone A+20 ppm platinum catalyst as Pt+0.02 weight percent DEAZD;
Blend J: Silicone A+20 ppm platinum catalyst as Pt+0.05 weight percent DEAZD;
Blend K: Silicone A+20 ppm platinum catalyst as Pt+0.10 weight percent VAZO 67;
Blend L: Silicone A+20 ppm catalyst as Pt+1.0 weight percent VAZO 67;
Blend M: Silicone A+20 ppm platinum catalyst as Pt+0.10 weight percent VAZO 88;
Blend N: Silicone A+25 ppm platinum catalyst as Pt+0.05 weight percent DIAZD (diisopropylazodicarboxylate).

Ultraviolet and thermal curing were assessed as described in Example 1. The results are set forth in Table II.

TABLE II

| Blend | Coating Thickness | Substrate | UV Exposure, J cm$^{-2}$ | 75° C. Oven Dwell time, min. | Potlife | Results |
|---|---|---|---|---|---|---|
| H | — | — | — | — | <1 min. | Azobenzene not an inhibitor |
| I | 5 mil | SCK | 1.30 | — | 5 hrs. | Cured to smear-free film; good anchorage |
| " | 5 mil | Stainless Steel | 3.15 | — | " | Cured to smear-free film; good anchorage |
| " | 5 mil | Stainless steel | — | 7 | " | Cured to smear-free film; good anchorage |
| " | Thin film | SCK | 0.63 | — | " | Cured; sl. smear, no migration |
| J | 5 mil | SCK | 3.1 | — | >30 hrs | Cured to smear-free film; good anchorage |
| " | 5 mil | SCK | — | 7.5 | " | Cured to smear-free film; good anchorage |
| " | 5 mil | Stainless Steel | — | 12 | " | Cured to smear-free film; good anchorage |
| " | 5 mil | Stainless Steel | 7.2 | — | " | Cured to smear-free film; good anchorage |
| K | — | — | — | — | 4 min. | VAZO 67 a poor inhibitor |
| L | 1 mil | SCK | 3.1 | — | 10 min. | VAZO 67 a poor |

TABLE II-continued

| Blend | Coating Thickness | Substrate | UV Exposure, J cm$^{-2}$ | 75° C. Oven Dwell time, min. | Potlife | Results |
|---|---|---|---|---|---|---|
| M | — | — | — | — | <3 min. | inhibitor VAZO 88 a poor inhibitor |
| N | 5 mil | SCK | 3.1 | — | 10 hrs. | Smear-free elastic film-good anchorage |
| " | 5 mil | Stainless Steel | 6.2 | — | " | Smear-free elastic film-good anchorage |
| " | Thin film | SCK | 1.0 | — | " | Sl smear, no migration |
| " | 5 mil | SCK | — | 5 min. | " | Smear-free film. |

EXAMPLE 3

Several experiments were run to establish that UV curing of the UV/thermal system takes place without requiring a significant thermal assist from the heat of the mercury vapor lamp. A "shadow" experiment was conducted using a 9:1 blend of J and G by applying a 5 mil thick coating onto super calendered kraft (SCK) paper, with an L-shaped piece of metal set up across the coating in such a way as to prevent UV radiation from reaching the coating beneath it. Two passes through the UV Processor (PPG QC 1202) at 20 feet per minute with total UV flux at 3.1 J cm$^{-2}$ cured the exposed portion of the coating while the shadowed section remained wet. The uncured part of this specimen was then cured by heating at 75° C. for five minutes.

EXAMPLE 4

In the previous examples it was observed that fully cured sections of the coating compositions employing DEAZD and DIAZD as UV-deactivated inhibitors are colorless, whereas freshly prepared coating blends are vivid yellow in color. Since the yellow blends without organohydrogenpolysiloxane crosslinking agent have maintained their color for several weeks, it appears that the SiH-containing species is also involved in the loss of the azo inhibitor, apparently occurring either during UV or thermal initiated curing. Differential scanning calorimetry (DSC) and UV-visible spectroscopy have confirmed this. Two experiments were run to see what effect UV exposure would have on the shape and position of exotherms observed via DSC of coating baths containing different relative amounts of Pt: DEAZD. In each case a shallow cup was filled with a 9:1 blend of Silicone A containing 20 ppm platinum catalyst as Pt to Silicone B. In the first experiment 200 ppm DEAZD was present and in the second experiment 500 ppm of DEAZD was present. DSC runs were made immediatey after blending, then immediately after exposure to measured amounts of UV radiation.

The platinum catalyzed hydrosilation reaction is an exothermic reaction amenable to DSC analysis. As a sample is slowly heated a large exotherm is generated, the shape and position of which is largely dependent on the concentrations and identity of the platinum catalyst and inhibitor. As the amount of inhibitor is decreased the exotherm is observed at a lower temperature (all other variables being held constant). The DSC results are summarized in Table III.

TABLE III

| Experiment 1: 20 ppm Pt, 200 ppm DEAZD | | | |
|---|---|---|---|
| UV Flux, J cm$^{-2}$ | Exotherm onset, °C. | Exotherm peak, °C. | Ea*, KJ/mole |
| 0 | 94 | 115 | 308 |
| 0.68 | 80 | 107 | 269 |
| 1.36 | 65 | 97 | 157 |
| 2.04 | 55 | 87 | 152 |
| 2.72 | (cured) | | |
| Experiment 2: 20 ppm Pt, 500 ppm DEAZD | | | |
| UV Flux, J cm$^{-2}$ | Exotherm onset, °C. | Exotherm peak, °C. | Ea, KJ/mole |
| 0 | 135° C. | 158° C. | 560 |
| 0.68 | 127° C. | 147° C. | 523 |
| 1.36 | 119° C. | 143° C. | 447 |
| 2.04 | 113° C. | 137° C. | 405 |
| 2.72 | 91° C. | 120° C. | 193 |
| 3.40 | (cured) | | |

*Ea = Energy of Activation

Thus it appears that exposure to ultraviolet radiation acts to reduce the effective concentration of DEAZD inhibitor, thereby lowering the activation energy and the temperature required to initiate crosslinking.

EXAMPLE 5

To illustrate the present invention in a resinous system, a blend of 300 grams of a 200 centipoise vinyl-terminated linear dimethylpolysiloxane fluid and 180 grams of MD$^{VI}$Q resin was prepared, then treated with 25 ppm platinum catalyst as Pt and 3000 ppm DEAZD. This material was a clear yellow fluid having a viscosity of 1440 centipoise at 25° C. 9 parts of this material were blended with 1 part of Silicone B to form a coating bath having a useful pot life in excess of 6 hours. The results of ultraviolet and thermal curing are set forth in Table IV.

TABLE IV

| Substrate | UV Exposure | 75° C. Dwell Time | Remarks |
|---|---|---|---|
| SCK | 4.6 J cm$^{-2}$ | — | Cured to smear-free coating; good anchorage |
| Stainless Steel | 7.7 J cm$^{-2}$ | — | Cured to smear-free coating; good anchorage |
| Stainless Steel | — | 7.5 minutes | Cured to smear-free coating; good anchorage |

I claim:
1. A curable composition comprising:

(a) an organopolysiloxane base polymer comprising an olefinorganopolysiloxane having structural units of the formula:

$$R_a(R^1)_b SiO_{\frac{4-a-b}{2}}$$

where R is an organic radical and $R^1$ is an olefinic radical, a has a value ranging from 0 to 3, b has a value ranging from about 0.005 to about 2.0, the sum of a+b ranging from about 0.8 to 3, and the viscosity of said olefinogranopolysiloxane ranging from about 10 centipoise to about 250,000,000 centipoise at 25° C.;
(b) an organohydrogenpolysiloxane crosslinking agent;
(c) an effective amount of precious metal containing catalyst; and
(d) an azo compound wherein at least one —N=N— moiety is not part of a cyclic structure, in an amount effective to inhibit reaction of said organopolysiloxane base polymer and said organohydrogenpolysiloxane crosslinking agent.

2. A composition as in claim 1, wherein the azo compound has the general formula $$R-N=N-R$$

where each R is an independently selected organic radical which may contain hetero atoms selected from the group consisting of oxygen, sulfur and nitrogen.

3. A composition as in claim 1, wherein the azo compound contains an electron withdrawing group bonded to the —N=N— moiety.

4. A composition as in claim 3, wherein the azo compound has the general formula $$R-X-N=N-X-R$$

where each R is an independently selected organic radical which may contain hetero atoms selected from the group consisting of oxygen, sulfur and nitrogen, and X is an electron withdrawing group.

5. A composition as in claim 4, wherein X is carbonyl.
6. A composition as in claim 3, wherein the azo compound has the general formula $$R^1-O-\underset{\underset{O}{\|}}{C}-N=N-\underset{\underset{O}{\|}}{C}-O-R^1$$

where each $R^1$ is an independently selected $C_{1-6}$ hydrocarbon radical.

7. A composition as in claim 6, wherein the azo compound is selected from the group consisting of diethylazodicarboxylate and diisopropylazodicarboxylate.

8. A composition as in claim 1, wherein the azo compound is present in an amount of from 0.005 weight percent to 2 weight percent.

9. A composition as in claim 6, wherein the azo compound is present in an amount of from 0.01 weight percent to 0.5 weight percent.

10. A composition as in claim 1, wherein R is selected from the group consisting of monovalent hydrocarbon radicals, halogenated monovalent hydrocarbon radicals and cyanoalkyl radicals, $R^1$ is selected from the group consisting of vinyl, allyl, acrylate and methacrylate, and mixtures thereof, and the viscosity ranges from 50 centipoise to 1,000,000 centipoise at 25° C.

11. A composition as in claim 10, wherein the viscosity ranges from 100 centipoise to 100,000 centipoise at 25° C.

12. A composition as in claim 1, wherein the precious metal catalyst is a platinum containing catalyst.

13. A method for making a curable composition, comprising mixing
(a) an organopolysiloxane base polymer comprising an olefinorganopolysiloxane having structural units of the formula:

$$R_a(R^1)_b SiO_{\frac{4-a-b}{2}}$$

where R is an organic radical and $R^1$ is an olefinic radical, a has a value ranging from 0 to 3, b has a value ranging from about 0.005 to about 2.0, the sum of a+b ranging from about 0.8 to 3, and the viscosity of said olefinorganopolysiloxane ranging from about 10 centipoise to about 250,000,000 centipoise at 25° C.;
(b) an organohydrogenpolysiloxane crosslinking agent;
(c) an effective amount of precious metal containing catalyst; and
(d) an azo compound wherein at least one —N=N— moiety is not part of a cyclic structure, in an amount effective to inhibit reaction of said organopolysiloxane base polymer and said organohydrogenpolysiloxane crosslinking agent.

14. A method for making an article of manufacture, comprising:
(I) applying to a substrate a curable composition which comprises:
(a) an organopolysiloxane base polymer comprising an olefinorganopolysiloxane having structural units of the formula:

$$R_a(R^1)_b SiO_{\frac{4-a-b}{2}}$$

where R is an organic radical and $R^1$ is an olefinic radical, a has a value ranging from 0 to 3, b has a value ranging from about 0.005 to about 2.0, the sum of a+b ranging from about 0.8 to 3, and the viscosity of said olefinorganopolysiloxane ranging from about 10 centipoise to about 250,000,000 centipoise at 25° C.;
(b) an organohydrogenpolysiloxane crosslinking agent;
(c) an effective amount of precious metal containing catalyst; and
(d) an azo compound wherein at least one —N=N— moiety is not part of a cyclic structure, in an amount effective to inhibit reaction of said organopolysiloxane base polymer and said organohydrogenpolysiloxane crosslinking agent;
(II) curing said curable composition.

15. A method as in claim 14, wherein curing is initiated by exposing the coated substrate to an effective amount of ultraviolet radiation.

16. A method as in claim 14, wherein curing is initiated by exposing the coated substrate to an elevated temperature.

17. A method as in claim 15, wherein the substrate is heat sensitive.

18. A method as in claim 17, wherein the substrate is a plastic having a low melting point.

19. A method as in claim 17, wherein the substrate is an electronic component.

20. A curable composition comprising:
(a) a polysiloxane having the general formula:

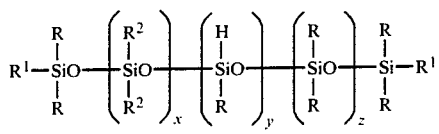

where each R is independently selected from substituted or unsubstituted monovalent hydrocarbon radicals having from 1 to 20 carbon atoms; $R^1$ is hydrogen, hydroxyl, or a substituted or unsubstituted hydrocarbon or hydrocarbonoxy radical having from 1 to 20 carbon atoms; $R^2$ is an olefinic radical; x is a number such that there is present from about 0.1 to about 20 mole percent olefin-containing siloxy units; y is a number such that there is present from about 0.5 to about 50 mole percent hydrogen-containing siloxy units; and $x+y+z$ is a number such that the viscosity of said polysiloxane is from about 25 centipoise to about 2,500,000 centipoise at 25° C.;

(c) an effective amount of precious metal containing catalyst; and (d) an azo compound wherein at least one —N=N— moiety is not part of a cyclic structure, in an amount effective to inhibit reaction of said polysiloxane.

* * * * *